United States Patent
Imoto

(10) Patent No.: US 6,786,609 B2
(45) Date of Patent: Sep. 7, 2004

(54) APPARATUS FOR WATCHING AROUND VEHICLE

(75) Inventor: Masayoshi Imoto, Nagoya (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/058,141

(22) Filed: Jan. 29, 2002

(65) Prior Publication Data

US 2002/0118471 A1 Aug. 29, 2002

(30) Foreign Application Priority Data

Feb. 27, 2001 (JP) .................................. 2001-052576

(51) Int. Cl.⁷ .............................................. G02B 27/00
(52) U.S. Cl. .................... 359/613; 359/834; 359/601
(58) Field of Search ................................. 357/834, 601, 357/618, 614, 613, 605, 606, 607, 629, 639, 640, 831, 478, 479

(56) References Cited

U.S. PATENT DOCUMENTS

| | | | | |
|---|---|---|---|---|
| 4,004,851 A | * | 1/1977 | Negishi et al. | 359/614 |
| 4,525,034 A | * | 6/1985 | Simmons | 359/488 |
| 4,634,223 A | * | 1/1987 | Ishii | 359/613 |
| 5,838,504 A | * | 11/1998 | Ichikawa et al. | 359/834 |
| 6,147,821 A | * | 11/2000 | Kadokura et al. | 359/834 |

FOREIGN PATENT DOCUMENTS

| | | | | |
|---|---|---|---|---|
| JP | 07-082510 | * | 3/1995 | C09D/5/00 |
| JP | 10-229512 A | | 8/1998 | |
| JP | 2000-139754 A | | 5/2000 | |
| JP | 2000-231289 A | | 8/2000 | |
| JP | 2001-318398 A | | 11/2001 | |

* cited by examiner

Primary Examiner—Drew A. Dunn
Assistant Examiner—Joshua L Pritchett
(74) Attorney, Agent, or Firm—Oliff & Berridge, PLC

(57) ABSTRACT

In an apparatus for watching around a vehicle, an internal reflection preventive film 37 for preventing stray light from undergoing total reflection in a prism is formed outside an effective area with respect to an imaging lens 9 disposed to the rear side 8B of the prism. Thus, the quantity of stray light is reduced by preventing the total reflection.

17 Claims, 14 Drawing Sheets

APPARATUS FOR WATCHING AROUND VEHICLE

BACKGROUND OF THE INVENTION

The present invention relates to an apparatus for watching around a vehicle by photographing surrounding scenes at a driver's dead angle in such a condition that does not offer unobstructed view to a driver ahead or behind the vehicle and on the right or left side of the vehicle so as to display the scenes to the driver.

FIG. 13 is a block diagram of a conventional apparatus for watching around a vehicle. This apparatus for watching around a vehicle 1 comprises an imaging device 11 disposed on the outer side of the vehicle and used for picking up scenes in the two opposed directions around the vehicle, an image inversion processing portion 12 for subjecting image signals supplied from the imaging device 11 to image inversion processing, and a display portion 15 that is set inside the vehicle chamber and used for displaying the image signals obtained from the image inversion processing portion 12.

The imaging device 11 has a shade casing 3 provided with a pair of right and left transmission window portions 2R and 2L formed of transparent glass in either side of the casing 3, which contains a prism 4 in the form of an isosceles triangle in section with its vertical angle 5 directed to the front part of the casing (the upper part of the casing 3 in FIG. 13), the right and left sides 8R and 8L of the prism 4 corresponding to the equal sides of the isosceles triangle being directed to the respective right and left transmission window portions 2R and 2L, and an imaging element 10 disposed to the rear of the prism 4 and used for converting rays of light 18R and 18L into image signals, the rays of light being incident on the respective sides 8R and 8L of the prism 4 and subjected to an optical path change within the prism 4 and guided via an imaging lens 9 onto an imaging plane.

The imaging device 11 is fitted to a front bumper, for example, so that its front part (the front part of the casing 3) is directed ahead and that the transmission window portions 2R and 2L are respectively directed right and left. In this condition, the ray of light 18L corresponding to the left side scene is as shown in FIG. 13 passed through the transmission window portion 2L and the side 8L of the prism 4, directly incident on the side 8R of the prism 4, reflected from the interior of the side 8R of the prism 4, emitted from the rear side 8B of the prism 4 and formed into an image through the imaging lens 9, which image is guided to the left half 10L of the imaging plane of the imaging element 10. In consideration of the ray of light 18R corresponding to the right side scene from the standpoint of bilateral symmetry, the ray of light is guided to the right half 10R of the imaging plane of the imaging element 10 likewise. Then both rays of light are converted by the imaging element 10 into image signals.

The right and left side scenes are picked up and the signals of the images thus picked up are subjected to the image inversion processing in the image inversion processing portion 12 before being supplied to the display portion 15 as shown in FIG. 13. In the display portion 15, the left side scene taken in from the transmission window portion 2L is displayed as the left half of the image on the left half 15L of a screen, whereas the right side scene taken in from the transmission window portion 2R is displayed as the right half of the image on the right half 15R of the screen.

In an apparatus 1 for watching around a vehicle, however, when a ray of light 21a emitted from a headlamp 21 is passed through the transmission window portion 2R and the side 8R of the prism 4 and directly incident on the rear side 8B of the prism 4 and totally reflected from the rear side 8B of the prism 4 while an oncoming vehicle with its headlamp 21 turned on is approaching, for example, the ray of light 21a is emitted to the side 8L of the prism 4 and incident on the transmission window portion 2L. At this time, though most of the ray of light 21a (96.1%) incident on the transmission window portion 2L is passed through the transmission window portion 2L and emitted outside, the remaining ray of light (3.2%) is incident on the side 8L of the prism 4 as reflected light 21b.

The reflected light 21b is passed through the side 8L of the prism 4, directly incident on the side 8R of the prism 4, reflected from the interior of the side 8R of the prism 4, emitted from the rear side 8B of the prism 4 and guided via the imaging lens 9 to the left half 10L of the imaging plane of the imaging element 10. Consequently, the reflected light 21b is subjected to image processing on the left half 10L of the imaging plane of the imaging element 10 after being synthesized with the ray of light 18L corresponding to the left side scene.

In this case, an image 21B deriving from the light 21b reflected from the transmission window portion 2L with the ray of light 21a emitted from the headlamp 21 and taken in from the transmission window portion 2R being passed therethrough is superposed on an image 22L of the left side scene taken in from the transmission window portion 2L on the left half 15L of the screen whereby to indicate an error.

In this manner, in the conventional apparatus 1 for watching around a vehicle, part of the scene taken in from one side of the transmission window portions 2R and 2L falls on the other side of the screens 15R and 15L of the display portion 15, thus causing an error in displaying, and the problem is that the visibility of a driver is deteriorated.

<First Proposal as an Example>

Therefore, the present applicant has made a first proposal by ways of example as shown in FIG. 14 (the Japanese Patent Application No. 2000-139754). Under the first proposal, in order to prevent part of the scene taken in from the left transmission window portion 2L from falling on the right half 15R of the screen in the display portion 15 and thus causing an error in displaying or to prevent part of the scene taken in from the right transmission window portion 2R from falling on the left half 15L of the screen therein and thus causing an error in displaying likewise, the angles of the transmission window portions 2R and 2L with the rear side 8B of the prism 4 have properly been set. Consequently, even though there is produced reflected light 21b that may be incident on the imaging element 10 as light is reflected from the interiors of the transmission window portions 2R and 2L, the reflected light 21b can be prevented from being emitted from the rear side 8B of the prism 4 after being totally reflected from the rear side 8B of the prism 4.

Since any unnecessary ray of light is prevented from being emitted from the rear side 8B of the prism 4, the ray of light can be prevented from falling on the screens 15R and 15L of the display portion 15. The visibility of the driver can also be improved accordingly.

<Second Proposal as an Example>

Further, the present applicant has also made a second proposal by ways of example as shown in FIG. 15 (the Japanese Patent Application No. 2000-231289). Under the second proposal, a shading portion 3a for cutting off light substantially laterally crossing a field in front of the prism 4 is provided between the vertical angle portion 5 of the prism 4 and the front end wall 28 of the casing 3A. With this arrangement, even though an ray of light from outside is incident ahead of the vertical angle portion 5 of the prism 4 so as to cross the field in front of the prism 4, the light is cut off by the shading portion 3a, so that a phantom image is made preventable from falling on the screen as a result of the fact that the light crossing the field in front of the prism 4 is reflected from the interiors of the transmission window portions 2R and 2L and enters the prism 4.

Under the second proposal, the prism 4 is fixedly held by a prism securing member 32 and disposed within the casing 3A. The prism securing member 32 is used to fix the prism 4 by, for example, clamping right and left corner portions in the rear portion of the prism 4 from both right and left sides and also serves to cut off any unnecessary ray of light from being incident upon the rear areas on the sides 8R and 8L of the prism 4.

Even in the second proposal, as such an unnecessary ray of light is prevented from entering the prism 4, the ray of light is prevented from falling on the screens 15R and 15L of the display portion 15 whereby to improve the visibility of the driver.

<New Problem>

In the case of the first and second proposals, though the unnecessary ray of light can be prevented from entering the imaging element 10 to a certain extent, the present applicant has further discovered a stray light path led to the imaging element 10 on the basis of detailed verification. FIG. 16 shows a path for stray light that is unpreventable according to the first and second proposals.

As shown in FIG. 16, assuming that a ray of light is emitted from P1 of the headlamp 21 of an oncoming vehicle, for example, in this case, the ray of light 21a emitted from the headlamp 21 is passed through the right transmission window portion 2R and then enters the prism 4 via a point P2 on the right side 8R of the prism 4. Further, the ray of light traveling in the prism 4 is totally reflected at a point P3 on the rear side 8B of the prism 4 and directed to the left side 8L of the prism 4. When the reflected light hits against a point P4 on the side 8L of the prism 4, about 4% of the reflected light is reflected thereat, directed to the rear side 8B of the prism 4 again, totally reflected at a point P5 and directed to the right side 8R of the prism 4. Further, about 4% of the reflected light is reflected at a point P6 and directed to the rear side 8B of the prism 4 again. Next, the reflected light is totally reflected at a point 7 on the rear side 8B of the prism 4 and directed to the side 8L of the prism 4. Then about 4% of the reflected light is reflected at a point P8 on the side 8L of the prism 4, totally reflected at a point P9 on the right side 8R of the prism 4 and moves out at a point P10 on the rear side 8B of the prism 4. The ray of light thus slipped out causes stray light to fall on the display portion 15.

More specifically, the three rounds of total reflections from the rear side 8B of the prism 4 as shown in FIG. 16 may be said to ultimately and mainly cause the stray light to fall on the display portion 15. If, therefore, even one round out of the three rounds of total reflections is made avoidable, the ultimate degree of causing such stray light to fall on the display portion 15 is considered to be drastically reducible.

SUMMARY OF THE INVENTION

An object of the present invention is to provide an apparatus for watching around a vehicle so as to prevent an error in displaying as a result of the fact that stray light heretofore remain unpreventable by the first and second proposals made for reference falls on the other side of a screen in a display portion.

In order to solve the foregoing problems, an apparatus for watching around a vehicle as the invention described in aspect 1 comprises an imaging device including a casing disposed on the outer side of the vehicle and having a pair of right and left transmission window portions in either side of the casing, which casing contains a prism in the form of an isosceles triangle in section with its vertical angle directed to the front part of the casing, the right and left sides of the prism which correspond to the equal sides of the isosceles triangle being directed to the respective right and left transmission window portions, and an imaging element disposed to the rear of the prism and used for converting a ray of light into an image signal by concentrating light on an imaging plane via an imaging lens, the ray of light being incident on one of the right and left sides of the prism, reflected from the other side of the prism and emitted from the rear side of the prism, internal reflection preventive means for preventing stray light from undergoing total reflection in the prism being formed outside an effective area with respect to the imaging lens disposed to the rear side of the prism.

In the invention described in aspect 2, the internal reflection preventive means is an internal reflection preventive film having a refractive index greater by 0.766 time than the refractive index of the prism.

In the invention described in aspect 3, the internal reflection preventive means is an internal reflection preventive film having a refractive index greater by 0.9 time than the refractive index of the prism.

In the invention described in aspect 4, the internal reflection preventive film is formed of black paint which absorbs the stray light.

In the invention described in aspect 5, the internal reflection preventive means is an adhesive member for sticking to the rear side of the prism a buffer member for buffering the prism with respect to a predetermined holder for supporting the prism.

In the invention described in aspect 6, the refractive index of the adhesive member is greater by 0.766 time than the refractive index of the prism.

In the invention as described in aspect 7, the refractive index of the adhesive member is greater by 0.9 time than the refractive index of the prism.

In the invention as described in aspect 8, the adhesive member is colored black so as to absorb the stray light.

In the invention as described in aspect 9, the internal reflection preventive means includes a light scattering plane formed outside an effective area with respect to the imaging lens disposed to the rear of the prism.

In the invention as described in aspect 10, black paint for absorbing stray light is applied to the light scattering plane.

In the invention as described in aspect 11, light absorbing means for absorbing light resulting from the partial reflection of the stray light from the side of the prism is formed in part of the side of the prism.

An apparatus for watching around a vehicle as the invention described in aspect 12 comprises an imaging device including a casing disposed on the outer side of the vehicle and having a pair of right and left transmission window portions in either side of the casing, which casing contains a prism in the form of an isosceles triangle in section with its vertical angle directed to the front part of the casing, the right and left sides of the prism which correspond to the equal sides of the isosceles triangle being directed to the respective right and left transmission window portions, and an imaging element disposed to the rear of the prism and used for converting a ray of light into an image signal by concentrating light on an imaging plane via an imaging lens, the ray of light being incident on one of the right and left sides of the prism, reflected from the other side of the prism and emitted from the rear side of the prism, light absorbing means for absorbing light with the partial reflection of the stray light from the side of the prism being formed in part of the side of the prism.

In the invention as described in aspect 13, the light absorbing means is black paint.

An apparatus for watching around a vehicle as the invention described in aspect 14 comprises an imaging device including a casing disposed on the outer side of the vehicle and having a pair of right and left transmission window portions in either side of the casing, which casing contains a prism in the form of an isosceles triangle in section with its vertical angle directed to the front part of the casing, the right and left sides of the prism which correspond to the equal sides of the isosceles triangle being directed to the respective right and left transmission window portions, and an imaging element disposed to the rear of the prism and used for converting a ray of light into an image signal by concentrating light on an imaging plane via an imaging lens, the ray of light being incident on one of the right and left sides of the prism, reflected from the other side of the prism and emitted from the rear side of the prism, corner portions formed with the sides of the prism and the rear side of the prism being cut in a range excluding a range of horizontal viewing angles of the prism.

In the invention as described in aspect 15, a light scattering plane is formed on each of the surfaces formed by cutting the corner portions.

In the invention as described in aspect 16, black paint for absorbing stray light is applied to the light scattering plane.

DETAILED DESCRIPTION OF THE PREFERRED EMBODIMENTS

<Embodiment 1>

Figure 1:
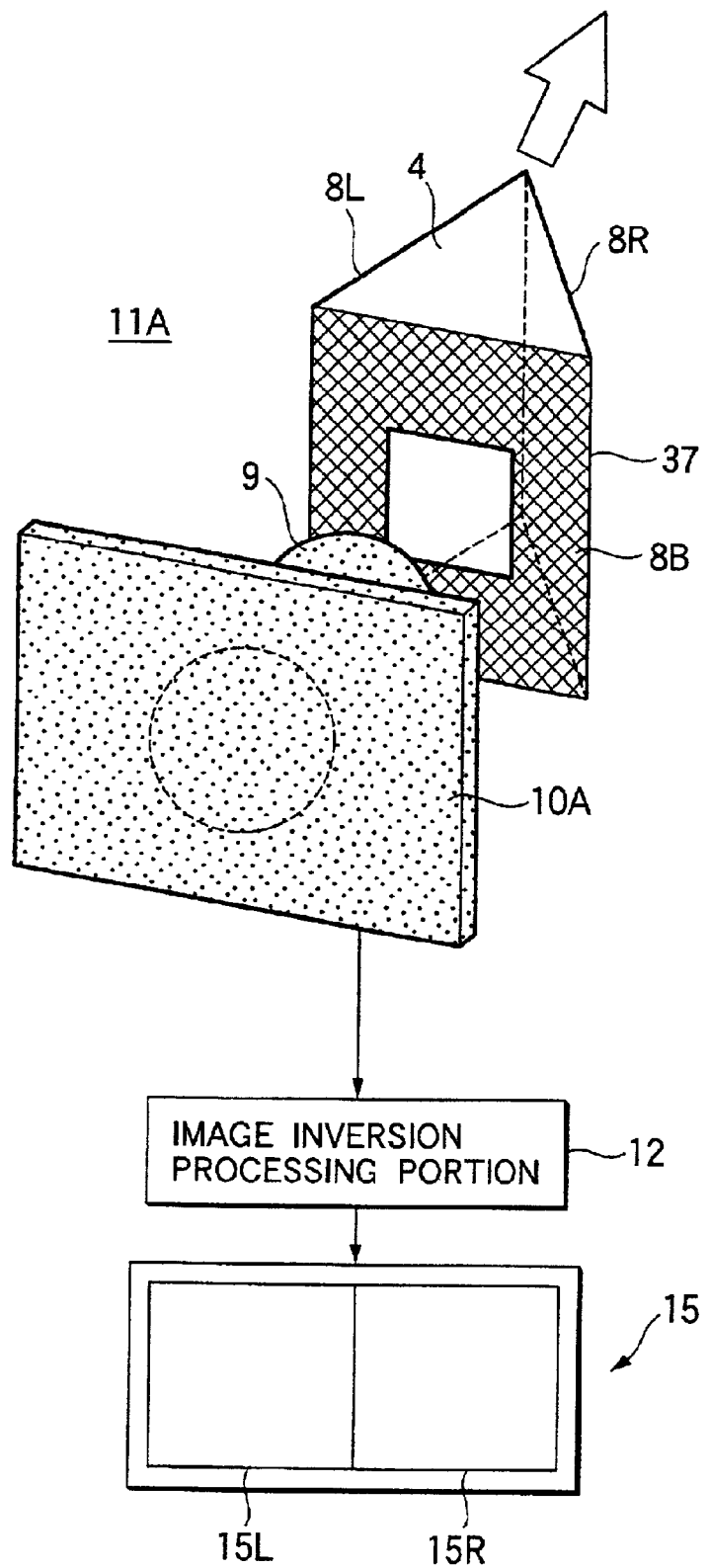
FIG. 1 is an exemplary diagram illustrating an apparatus for watching around a vehicle according to Embodiment 1 of the present invention.
Figure 2:
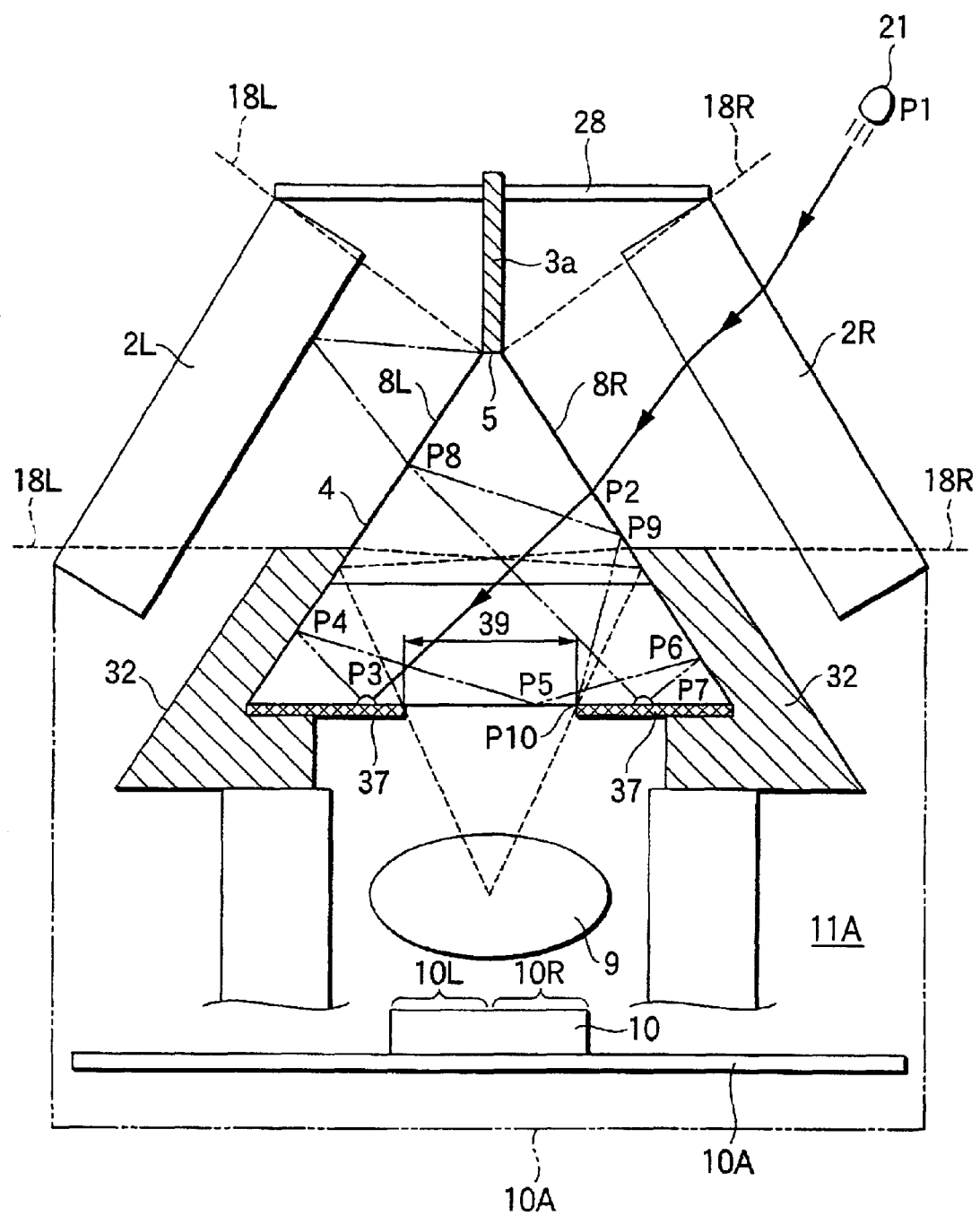
FIG. 2 is an exemplary diagram illustrating an imaging device constituting the apparatus for watching around a vehicle according to Embodiment 1 of the invention.
Figure 3:
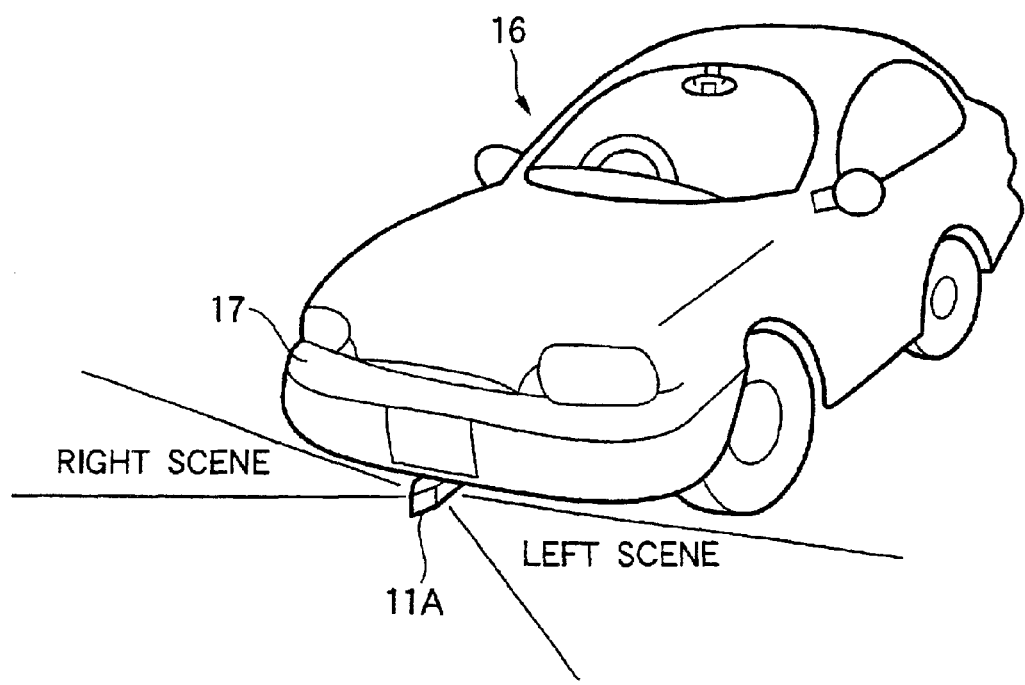
FIG. 3 is a diagram illustrating an on-vehicle imaging device forming the apparatus for watching around a vehicle by way of example according to Embodiment 1 of the invention.

Embodiment 1 of the present invention will now be described with reference to FIGS. 1 to 3. FIGS. 1 and 2 are schematic diagrams of an apparatus for watching around a vehicle according to Embodiment 1 of the invention and FIG. 3, a diagram illustrating an on-vehicle imaging device forming the apparatus for watching around a vehicle byway of example. In FIGS. 1 to 3, like reference characters designate like component parts whose functions are similar to those performed in the conventional apparatus and the exemplary proposals as stated above.

As shown in FIGS. 1 to 3, an apparatus 1A for watching around a vehicle according to this embodiment of the invention comprises an imaging device 11A fitted to the lower portion of, for example, a front bumper 17 on a vehicle, a display portion 15 formed with an LCD or a CRT provided in a position within a vehicle chamber where an instrument panel is installed so that a driver is able to easily watch the display portion, and an image inversion processing portion 12 for subjecting image signals picked up by the imaging device 11A to image inversion processing so as to supply the image signals to the display portion 15.

The imaging device 11A includes a shade casing 3A whose front portion of either side (the upper portion in FIG. 2) is shaped like an inverted V in plan view, a pair of right and left transmission window portions 2R and 2L that are positioned in the front portions of the sides of the casing 3A and fitted in the respective openings formed in the sides thereof, an imaging element 10 such as a CCD camera disposed in the casing 3A, an imaging lens 9, and a prism 4 for subjecting rays of light 18R and 18L that have entered by way of the respective transmission window portions 2R and 2L to an optical path change so as to guide the rays of light via the imaging lens 9 to the imaging plane of the imaging element 10.

In this case, the imaging lens 9 and the imaging element 10 constitute an imaging camera in which the following are set: focal distance f=4.6 mm, horizontal angle of view á=45° and F (F number)=2.8. Moreover, the imaging element 10 is mounted on a loading board 10A.

Further, the prism 4 is made of, for example, nitration material BK7 (refractive index n: 1.517), which is formed into a prism of an isosceles triangle in section. The vertical angle portion 5 of the prism 4 is so arranged as to be directed to the front portion of the casing (the upper portion in FIG.

2) in such a posture that the sides 8R and 8L of the prism 4 are directed to the respective transmission window portions 2R and 2L of the casing 3A and fixedly held by, for example, a prism securing member 32 in the casing 3A. The prism securing member 32 is used to fix the prism 4 by, for example, clamping right and left corner portions in the rear portion of the prism 4 from both right and left sides and also serves to cut off any unnecessary ray of light that does not form right and left scenes incident upon the rear areas on the sides 8R and 8L of the prism 4 (upon the lower areas on the sides 8R and 8L of the prism 4 in FIG. 1).

Further, the imaging lens 9 is fixed by a predetermined lens holder so that to the rear (the lower portion in FIG. 1) of the prism 4, the optical axis of the imaging lens 9 may coincide with the bisecting line of the vertical angle portion 5 of the isosceles triangle in section of the prism 4. Moreover, the imaging plane of the imaging element 10 is arranged in parallel to the rear side 8B of the prism 4 to the rear of the imaging lens 9.

A shading portion (shading means) 3a for cutting off light laterally crossing a field in front of the prism 4 is formed integrally with the inner part of the central portion of the front end wall 28 of the casing 3A. The shading portion 3a is made of non-light-transmitting resin equivalent to what is used for the casing 3A and its front end is projected so as to abut against the vertical angle portion 5 of the prism 4.

Further, an internal reflection preventive film 37 that is □-shaped in rear view is formed on the rear side 8B of the prism 4 so that a light transmission window 35 is formed in the central portion of the rear side 8B thereof. More specifically, black paint (ink) is applied to the internal reflection preventive film 37 in such a condition that the masking of an area (effective light transmission range) of the light transmission window 35 disposed to the rear side 8B of the prism 4 has been conducted.

In this case, a material satisfying the following equation (1) is used where n1=light refractive index and n2=light refractive index of the internal reflection preventive film 37.

$$n2/n1 > 0.9 \qquad (1)$$

The basis of the equation (1) will be explained below.

Figure 4:
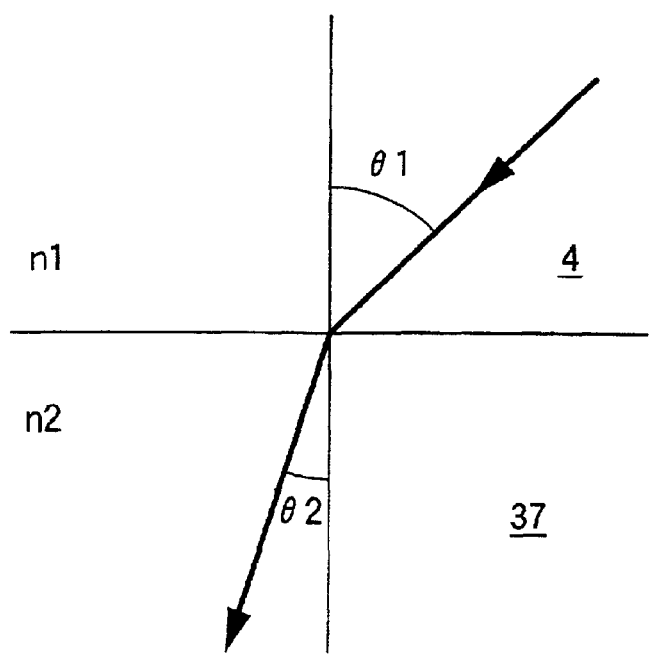
FIG. 4 is a diagram showing a state in which light is refracted on the interfacial boundary between a prism and an internal reflection preventive film by way of example.

In case where n2/n1 is greater than 1 first, that is, in case where an angle of incidence θ1 is greater than an angle of refraction θ2 as shown in FIG. 4, no total reflection theoretically occurs according to the Snell's law. Therefore, the most quantity of moving light in the prism 4 is emitted from the rear side 8B of the prism 4 toward the internal reflection preventive film 37 at P3 and P7 and the emitted light is absorbed by the internal reflection preventive film 37.

On the other hand, in case where n2/n1 is 1 or less, that is, in case where the angle of incidence θ1 is equal to or smaller than the angle of refraction θ2, total reflection occurs when the angle of incidence θ1 satisfies the condition of the following equation (2).

$$\sin θ1 > n2/n1 \qquad (2)$$

Figure 5:
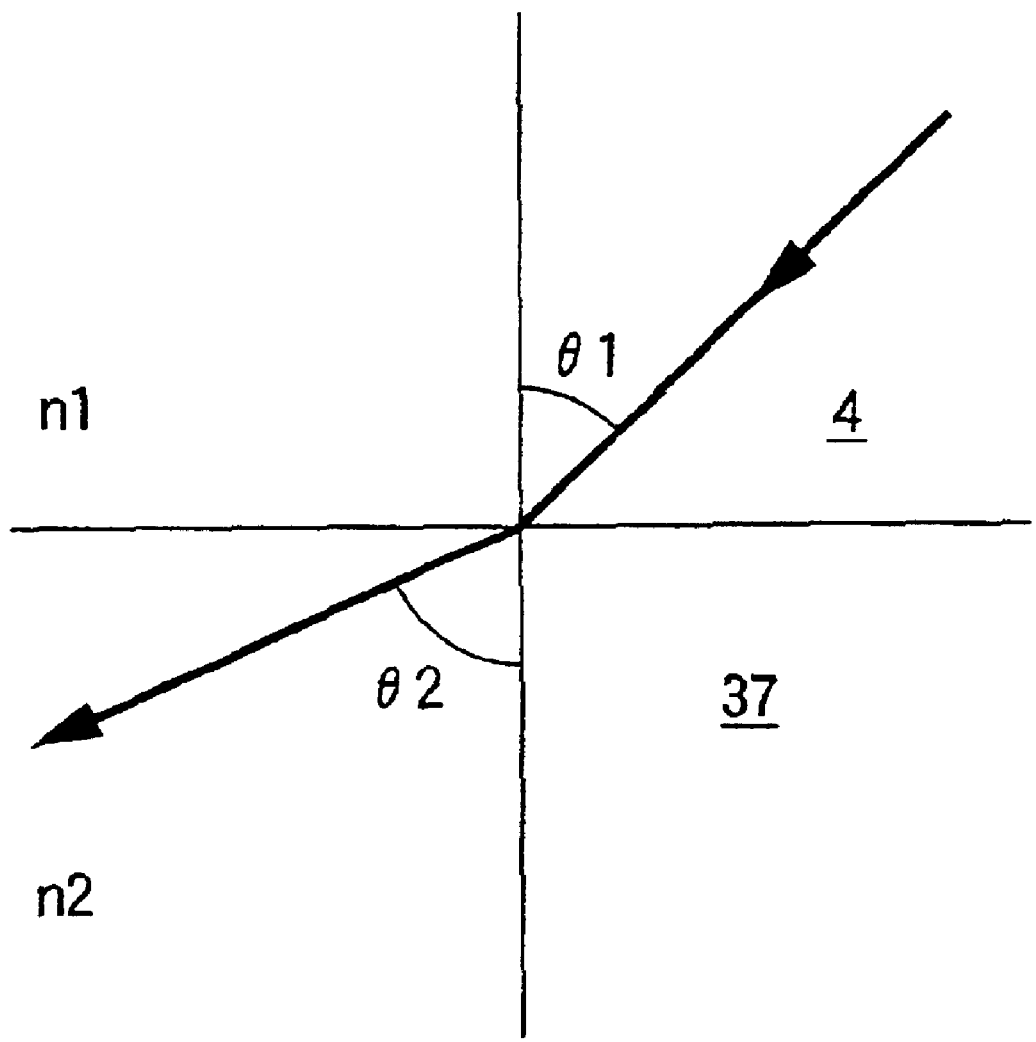
FIG. 5 is a diagram showing a state in which light is refracted on the interfacial boundary between a prism and an internal reflection preventive film as another example.
Figure 16:
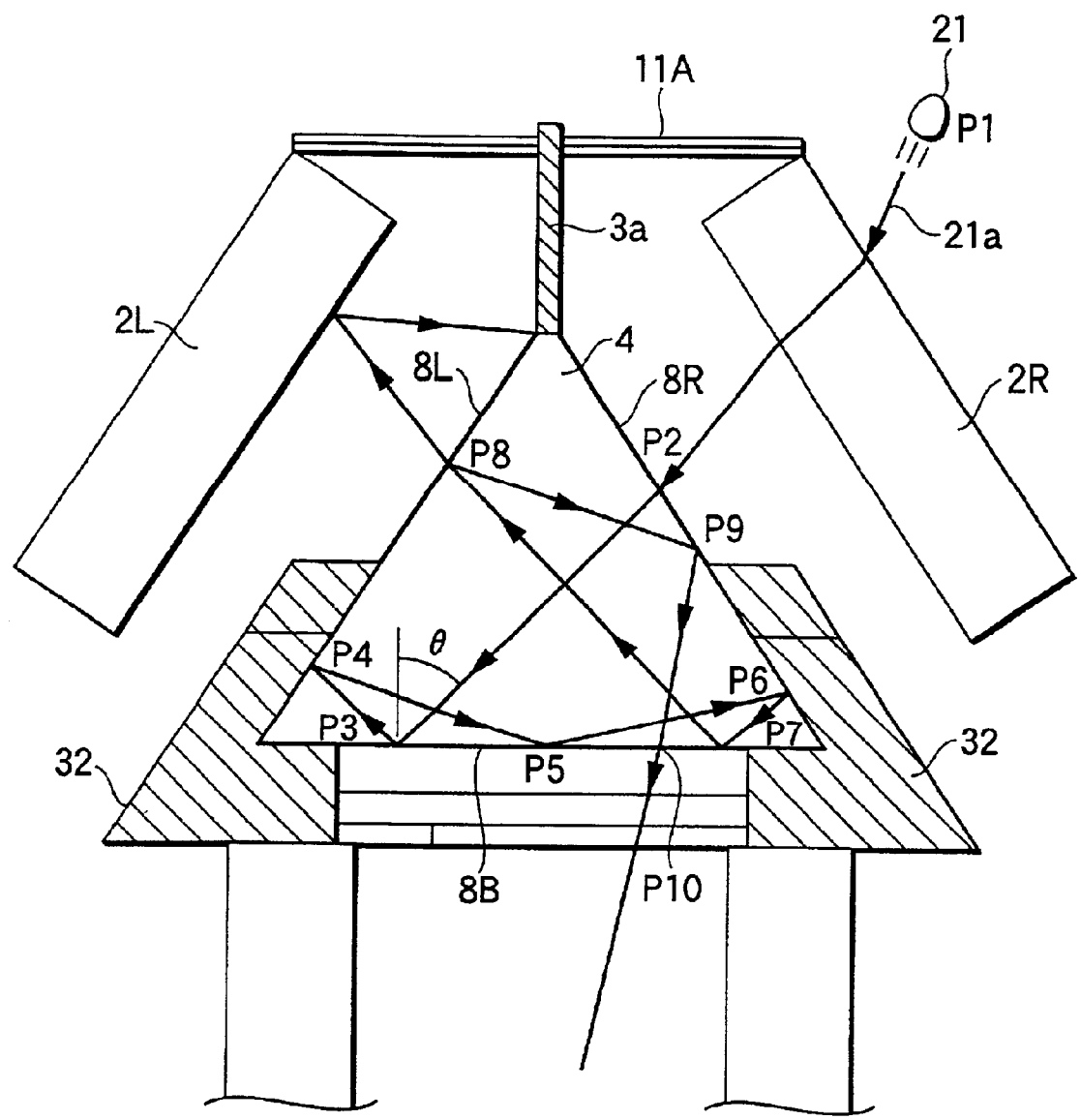
FIG. 16 is a diagram showing paths of stray light which are not preventable by the first and second examples of proposal.

Incidentally, when a ray of light P1 enters the prism 4 and reaches a point P3 on the rear side 8B of the prism 4 after being emitted from the headlamp 21 of an oncoming vehicle as shown in FIG. 2 like FIG. 16, for example, an angle of incidence (equivalent to θ1 in FIG. 5) at the point P3 on the interfacial boundary (i.e., the rear side 8B of the prism 4) between the prism 4 and the internal reflection preventive film 37 has been known to be about 50 degrees.

When it is taken into consideration that the angle of incidence θ1 may increase close to about 65 degrees in consideration of variation in that angle due to an error, n2/n1 is needed to be set greater than sin 65° (≈0.9) from the equation (2) above so as to prevent the total reflection at the point P3. In this case, light incident at about 50 degrees at the point P3 is not totally reflected as stated above but the most quantity of light is emitted from the point P3 onto the internal reflection preventive film 37 and absorbed by the internal reflection preventive film 37.

Accordingly, in order to prevent the moving light in the prism 4 from being totally reflected at the point P3 at which the moving light initially reaches the outer face of the prism 4, the refractive index n2 of the internal reflection preventive film 37 has to be greater than 1.365 (=1.517×0.9) in case where the refractive index n1 of the prism 4 is 1.517.

Although the equation (1) has been set in consideration of variation in the angle of incidence θ1 at the point P3 due to an error, thus causing the angle of incidence È1 to increase close to 65 degrees, it is not always necessary to strictly apply the condition of the equation (1) to the prevention of the total reflection at the point P3 in case where the angle of incidence θ1 at the point P3 is precisely 50 degrees. More specifically, as sin 50°=0.766, it is a minimum requirement to satisfy the following equation (3).

$$n2/n1 > 0.766 \qquad (3)$$

Therefore, the refractive index n2 of the internal reflection preventive film has to be greater than 1.162 (=1.517×0.766).

The operation of the apparatus for watching around a vehicle thus arranged will be described.

As shown in FIG. 2, while the imaging device 11A is fitted to the front part of front bumper with the imaging device 11A directed ahead of the vehicle and with the transmission window portions 2R and 2L respectively direct to right and left, for example, the ray of light 18L corresponding to the left side scene is passed through the transmission window portion 2L and the side 8L of the prism 4, directly incident on the side 8R of the prism 4, internally reflected from the side 8R of the prism 4, emitted from the rear side 8B of the prism 4, formed into an image through the imaging lens 9 and guided to the left half 10L of the imaging plane of the imaging element 10. In consideration of bilateral symmetry, the ray of light 18R corresponding to the right side scene is guided to the right half 10R of the imaging plane of the imaging element 10 likewise. Then both rays of light are converted into image signals.

Thus the right and left side scenes are picked up and the image signals thus picked up are subjected to the image inversion processing, so that the image signals are supplied to the display portion 15. In the display portion 15, the left side scene taken in from the transmission window portion 2L is displayed as the left half of the image on the left half 15L of the screen, whereas the right side scene taken in from the transmission window portion 2R is displayed as the right half of the image on the right half 15R of the screen as shown in FIG. 1.

Incidentally, assuming that a ray of light is emitted from P1 of the headlamp 21 of an oncoming vehicle, for example, in this case, the ray of light 21a emitted from the headlamp 21 is passed through the right transmission window portion 2R and then enters the prism 4 via the point P2 on the right side 8R of the prism 4. Then moving light in the prism 4 reaches the point P3 on the rear side 8B of the prism 4.

As the internal reflection preventive film 37 is formed at the point P3 on the rear side 8B of the prism 4, however, light incident at about 50 degrees is not totally reflected but only partially reflected and the most quantity of light is emitted from the point P3 toward the internal reflection preventive film 37, so that the emitted light is absorbed by the internal reflection preventive film 37.

Similarly, stray light in the prism 4 is prevented from being totally reflected and is only partially reflected even at the point P7.

Therefore, as the total reflection at the points P3 and 7 is preventable in comparison with the conventional apparatus and the exemplary proposals, the quantity of stray light thus reached becomes extremely smaller than that in the conventional example and the exemplary proposals, even though the light reflected at the point P3, point 4, point 5, point 6, point 7, point 8 and point 9 reaches a point P10 in the prism 4. Further, according to this embodiment of the invention, the stray light is absorbed by the black internal reflection preventive film 37 at the point P10.

The stray light is thus totally reflected at least a plurality of times in the prism 4 and when the stray light is ultimately emitted toward the imaging lens 9 and imaging element 10, the stray light is prevented from being emitted toward the imaging lens 9 and the imaging element 10 because the internal reflection preventive film 37 having such a refractive index as to prevent the total reflection from occurring at the angle of incidence È1 thereat is applied to any one of the plurality of positions where the stray light is totally reflected the plurality of times (e.g., at the points P3 and P7). Consequently, the stray light is ultimately prevented from being emitted toward the imaging lens 9 and the imaging element 10, so that the quality of the image picked up by the imaging device 11A can be improved.

<Embodiment 2>

Embodiment 2 of the invention will now be described with reference to FIGS. 6 and 7, wherein like reference characters designate like component parts and the description thereof will be omitted except that only component parts different from those in Embodiment 1 thereof are described.

Figure 6:
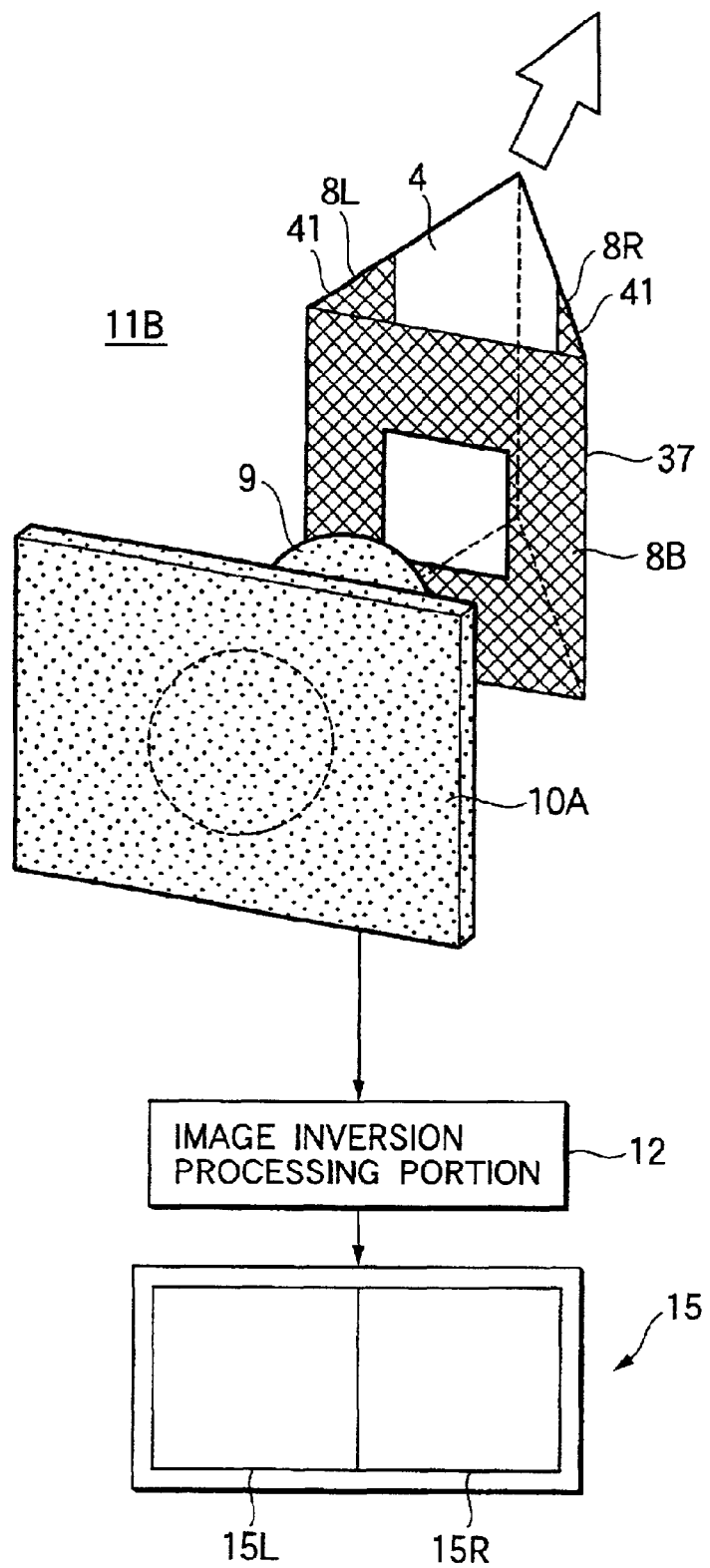
FIG. 6 is an exemplary diagram illustrating an apparatus for watching around a vehicle according to Embodiment 2 of the present invention.
Figure 7:
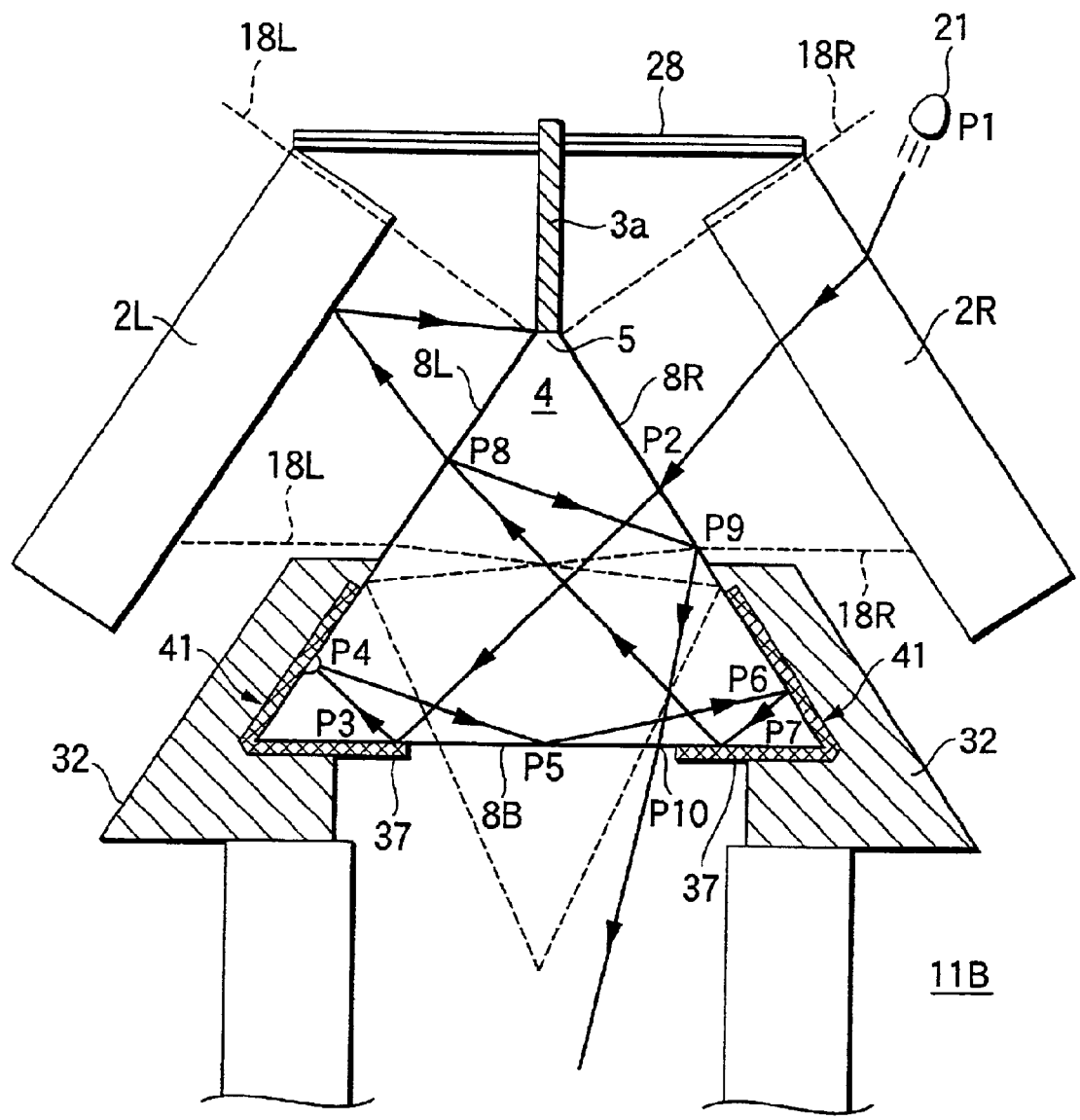
FIG. 7 is an exemplary diagram illustrating an imaging device constituting the apparatus for watching around a vehicle according to Embodiment 2 of the invention.

As shown in FIGS. 6 and 7, an imaging device 11B is capable of not only preventing total reflection at the points P3 and P7 by forming the internal reflection preventive film 37 in the rear side 8B of the prism 4 like the imaging device 11A in Embodiment 1 but also reducing the quantity of partially reflected light even at the points P4 and P6 by forming a light absorbing film 41 in both predetermined areas on the sides 8R and 8L of the prism 4 using the same material. The light absorbing films 41 are formed by screen printing and each film forming range is outside an effective range of viewing angles for visually recognizing the surroundings and set in a portion adjacent to the rear side 8B of the prism 4.

According to this embodiment of the invention, stray light is repeatedly reflected in the prism 4 and when it ultimately reaches the point P10, the quantity of stray light greatly attenuates, whereby the quality of the image picked by the imaging device 11B can be improved.

<Embodiment 3>

Embodiment 3 of the invention will now be described with reference to FIGS. 8 to 10, wherein like reference characters designate like component parts and the description thereof will be omitted except that only component parts different from those in Embodiment 1 thereof are described.

Figure 8:
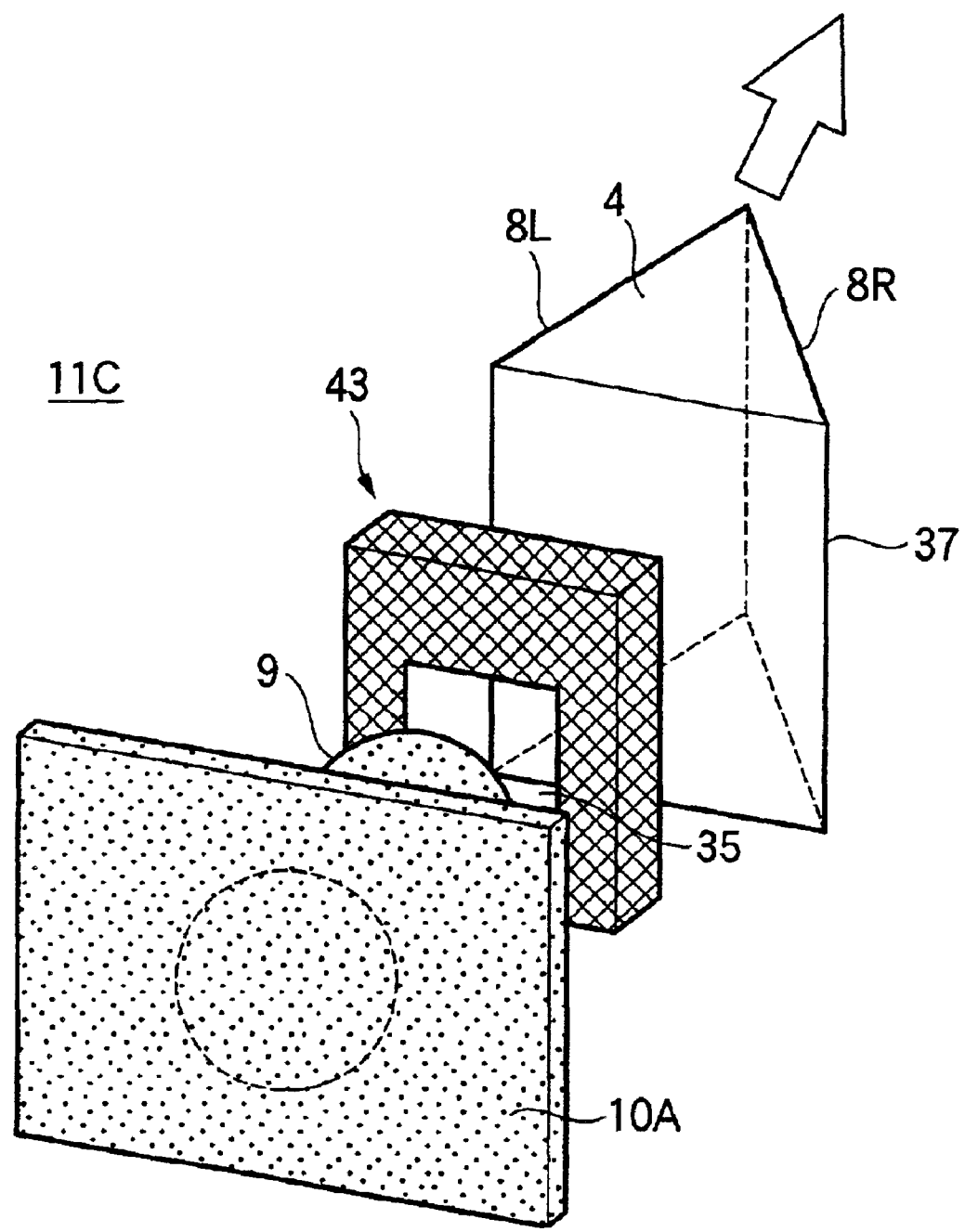
FIG. 8 is an exemplary diagram illustrating an apparatus for watching around a vehicle according to Embodiment 3 of the present invention.
Figure 9:
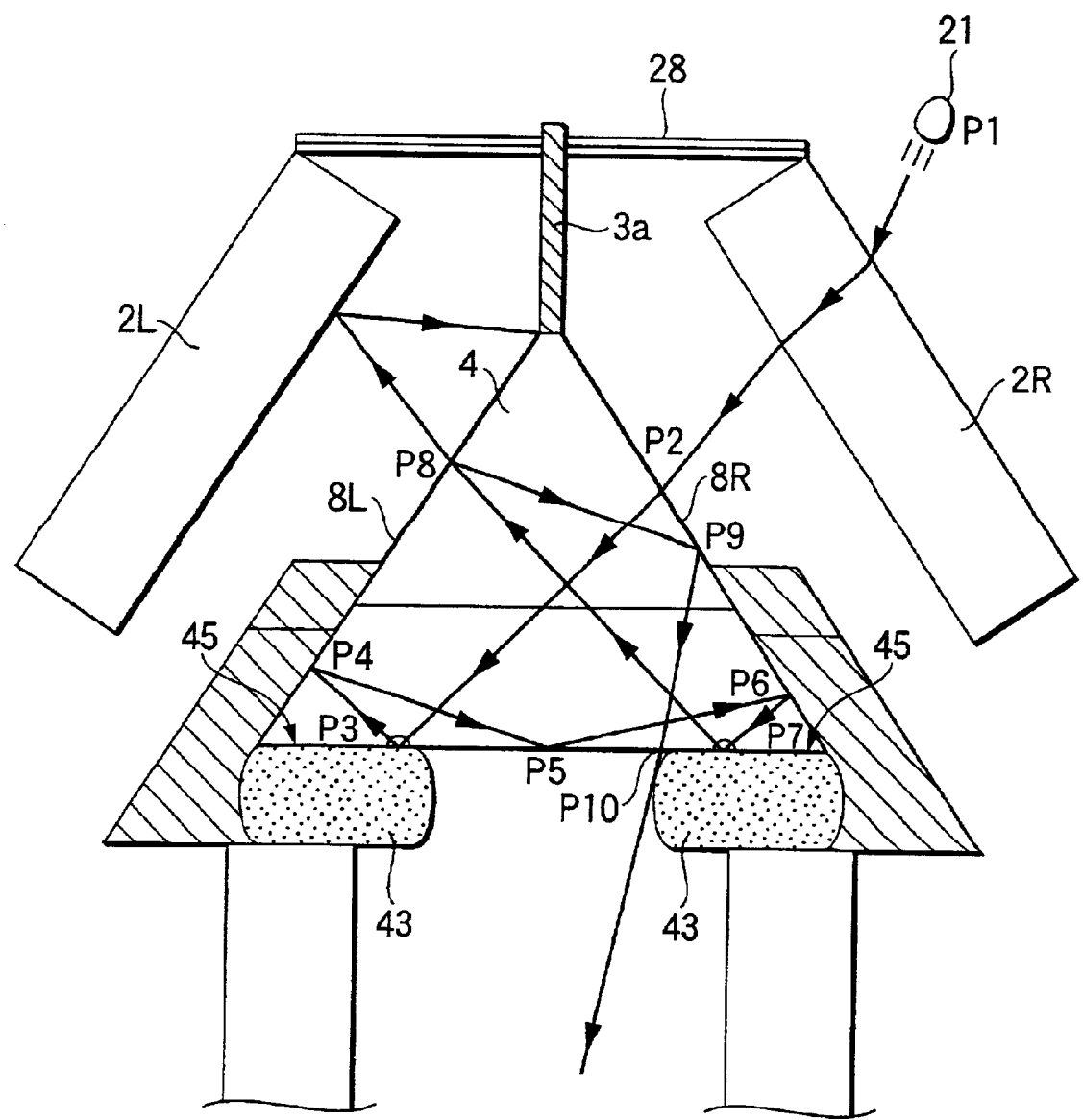
FIG. 9 is an exemplary diagram illustrating an imaging device constituting the apparatus for watching around a vehicle according to Embodiment 3 of the invention.
Figure 10:
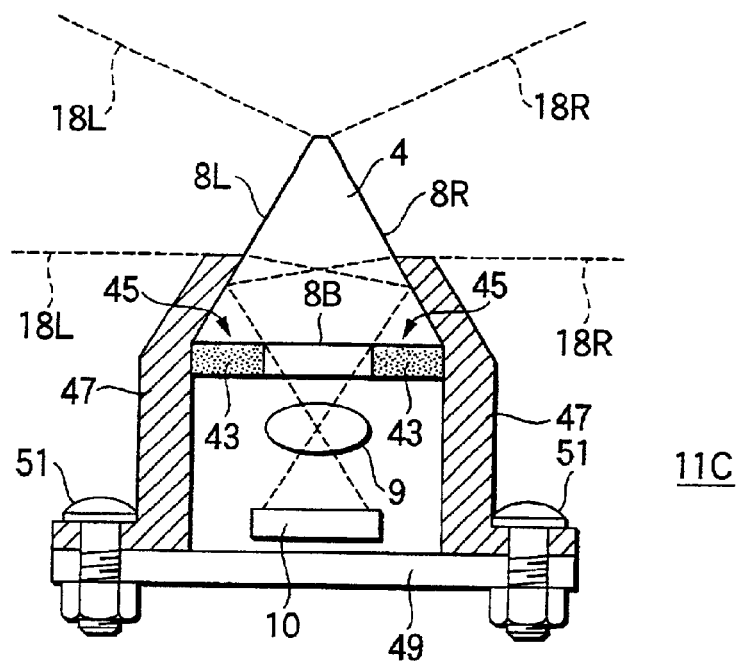
FIG. 10 is an exemplary diagram illustrating an imaging device constituting the apparatus for watching around a vehicle according to Embodiment 3 of the invention.

An imaging device 11C according to this embodiment of the invention is formed by sticking a buffering sponge (buffer member) 43 as shown in FIGS. 8 to 10, in place of the internal reflection preventive film 37, onto the rear side 8B of the prism 4 with an adhesive member 45 for preventing internal reflection.

The buffering sponge 43 is made of ordinary material such as urethan and used to secure the rear side 8B of the prism 4 to a holder 47 so as to serve as a buffer for the prism 4 against the vibration of the holder 47. In this case, reference numeral 49 in FIG. 10 denotes a fixing board and 51, clamp screws therein for clamping the holder 47 to the fixing board.

Further, the adhesive member 45 employs an acrylic adhesive tape and the refractive index of the adhesive member 45 is set greater than that of the prism 4, whereby light in the prism 4 can theoretically be prevented from being totally reflected from the rear side 8B of the prism 4. Moreover, the adhesive member 45 is colored black and adapted to absorb the light on the rear side 8B of the prism 4.

The area of the rear side 8B of the prism 4 to which the adhesive member 45 and the buffering sponge 43 are attached is □-shaped in rear view as in Embodiment 1 so that the light transmission window 35 is formed in the central portion of the area.

According to this embodiment of the invention, since the total reflection at the points P3 and P7 is also preventable as in Embodiment 1, even though stray light is reflected at the points P3, P4, P5, P6, P7, P8 and P9 and the reaches P10 in the prism 4, the quantity of stray light thus reached is extremely smaller than that in the conventional example and the exemplary proposals. According to this embodiment of the invention, moreover, the quality of an image for use in visually recognizing the surroundings can be improved by making the black adhesive member 45 absorb stray light at the point P10.

<Embodiment 4>

Figure 11:
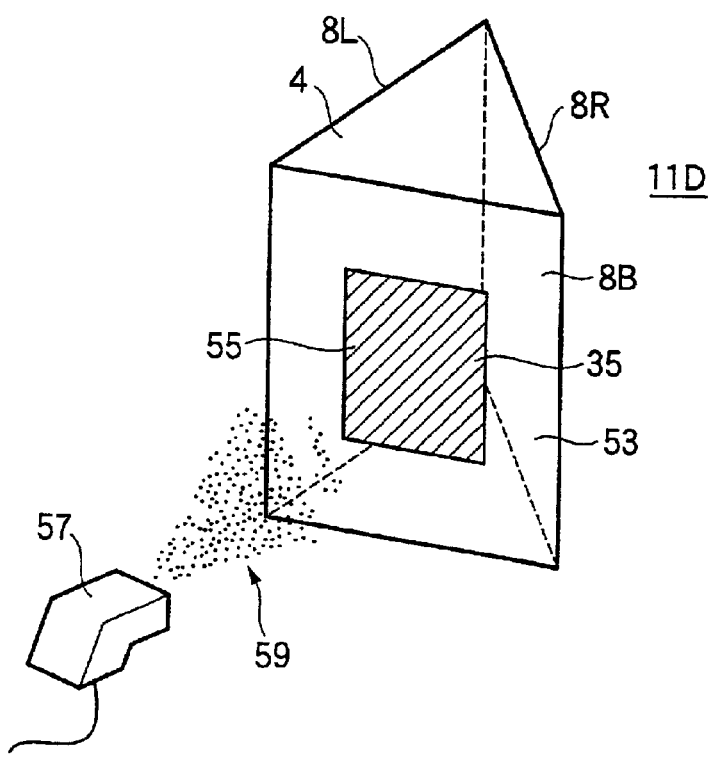
FIG. 11 is an exemplary diagram illustrating a prism constituting an apparatus for watching around a vehicle according to Embodiment 4 of the invention.

FIG. 11 is a diagram showing the prism 4 in Embodiment 4 of the invention, wherein like reference characters designate like component parts and the description thereof will be omitted except that only component parts different from those in Embodiment 1 thereof are described.

An imaging device 11D is used to prevent total reflection on a light scattering plane 53 in the prism 4 by subjecting a predetermined area on the rear side 8B of the prism 4 to abrasive blasting so as to form the light scattering plane 53, in place of the internal reflection preventive film 37 in Embodiment 1. The area in which the light scattering plane 53 is formed is □-shaped in rear view as in Embodiment 1 so that the light transmission window 35 is formed in the central portion of the area. When the light scattering plane 53 is formed, moreover, the area used to form the light transmission window 35 is masked with a predetermined masking material 55 and then subjected to abrasive blasting by spraying predetermined grains by using compressed air with a predetermined grain sprayer 57.

While the mask material 55 is formed, further, the surface thus subjected to the abrasive blasting is colored with predetermined black paint (not shown).

Thus, the total reflection of stray light can be prevented by the light scattering plane 53 in the area (including the points P3 and P7 in Embodiment 1) processed by the abrasive blasting and moreover the stray light can also be absorbed by the black paint.

As the total reflection at the points P3 and P7 is prevented as in Embodiment 1 by the light scattering plane 53 like this even according to this embodiment of the invention, even though stray light is reflected at the points P3, P4, P5, P6, P7, P8 and P9 and the reaches P10 in the prism 4, the quantity of stray light thus reached is extremely smaller than that in the conventional example and the exemplary proposals. According to this embodiment of the invention, moreover, the quality of an image for use in visually recognizing the surroundings can be improved by making the black paint absorb stray light at the point P10.

<Embodiment 5>

Embodiment 5 of the invention will now be described with reference to FIG. 12, wherein like reference characters designate like component parts and the description thereof will be omitted except that only component parts different from those in Embodiment 1 thereof are described.

Figure 12:
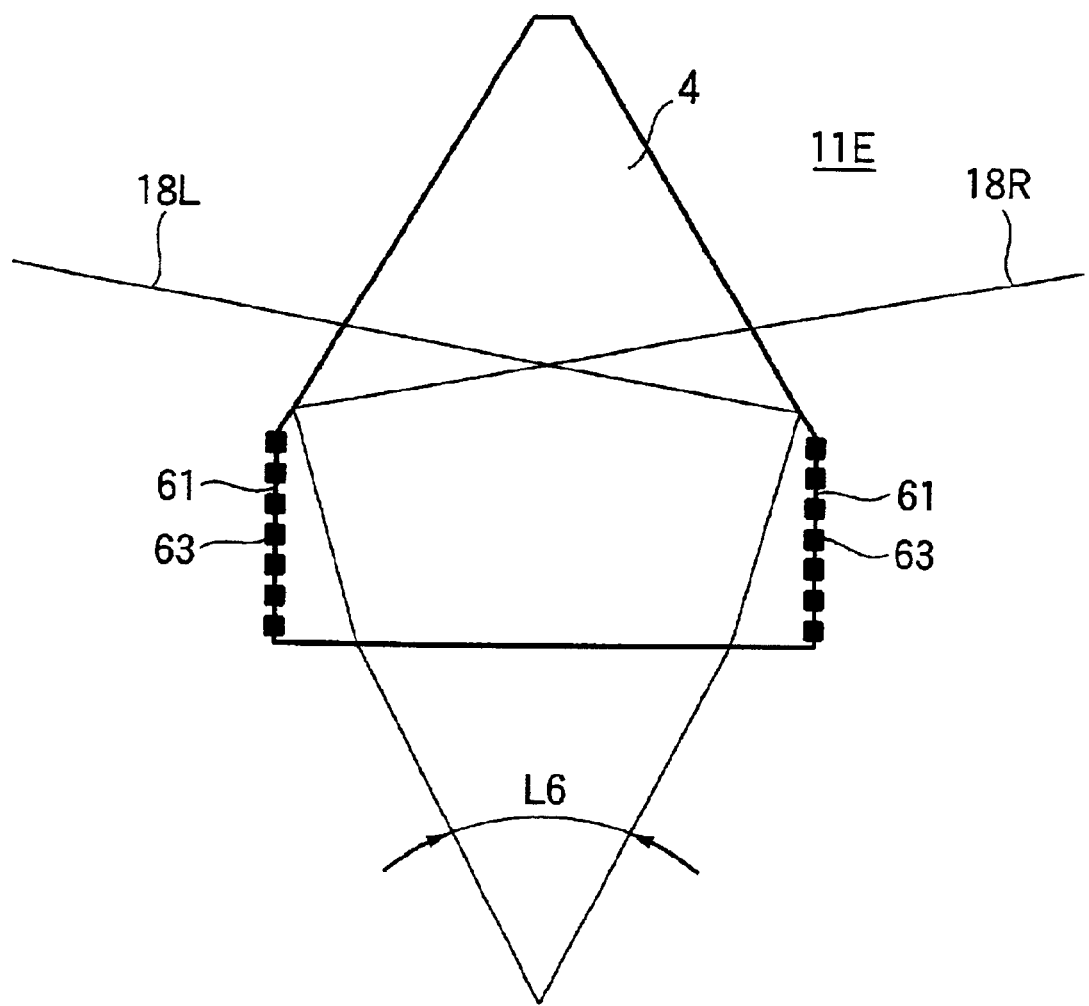
FIG. 12 is an exemplary diagram illustrating a prism constituting an apparatus for watching around a vehicle according to Embodiment 5 of the invention.
Figure 13:
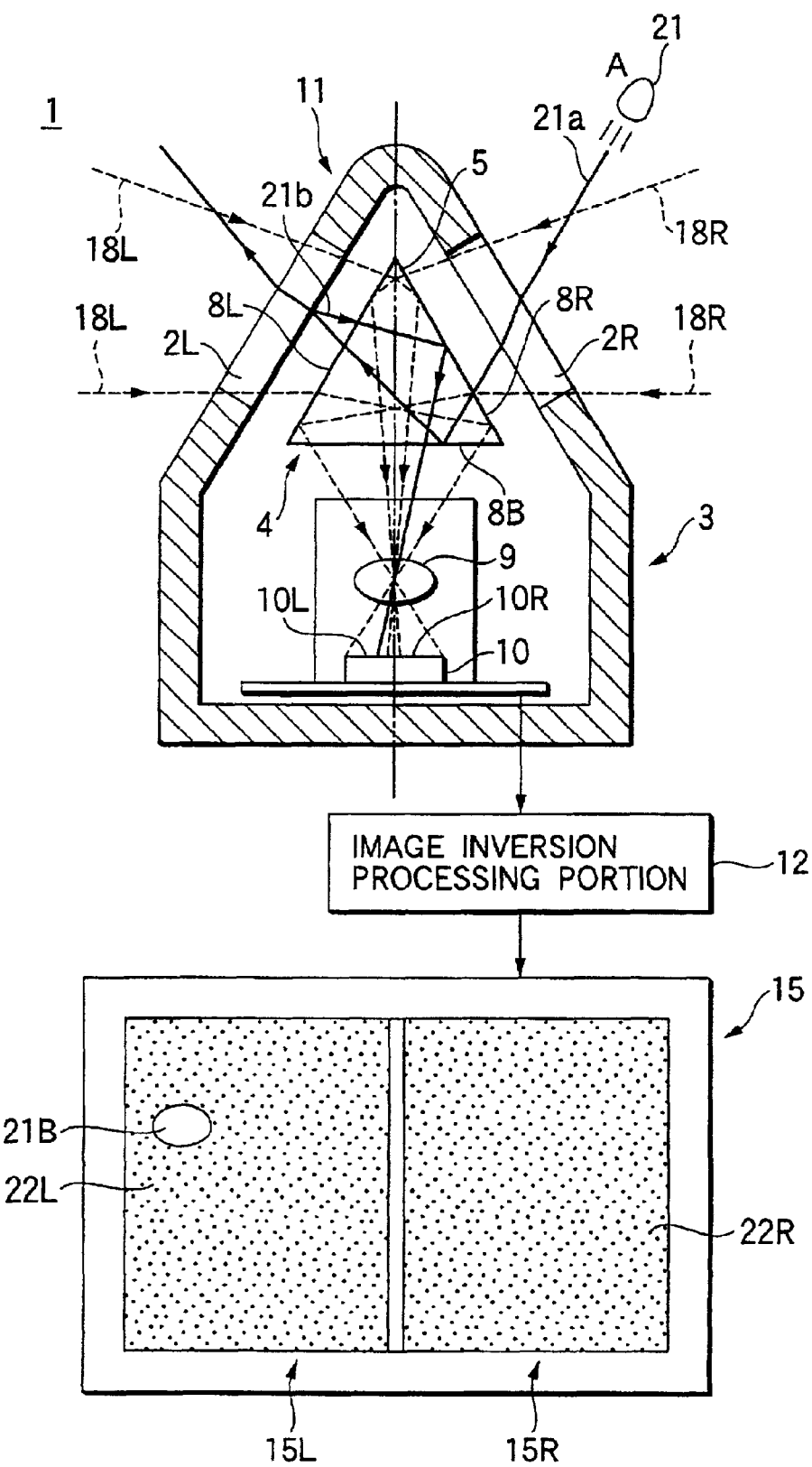
FIG. 13 is an exemplary diagram illustrating a convention apparatus for watching around a vehicle.
Figure 14:
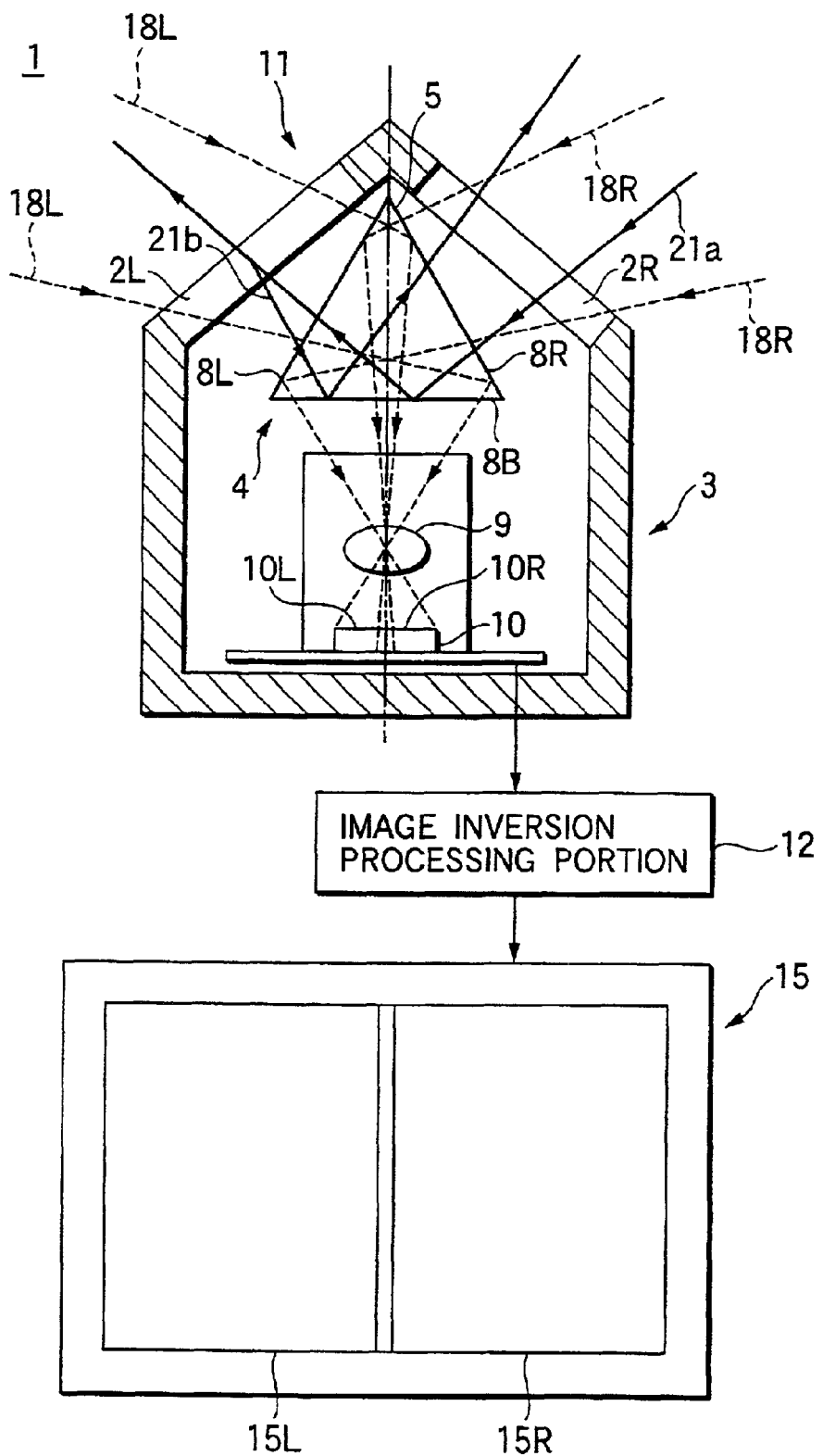
FIG. 14 is a diagram illustrating an apparatus for watching around a vehicle in a first example of proposal.
Figure 15:
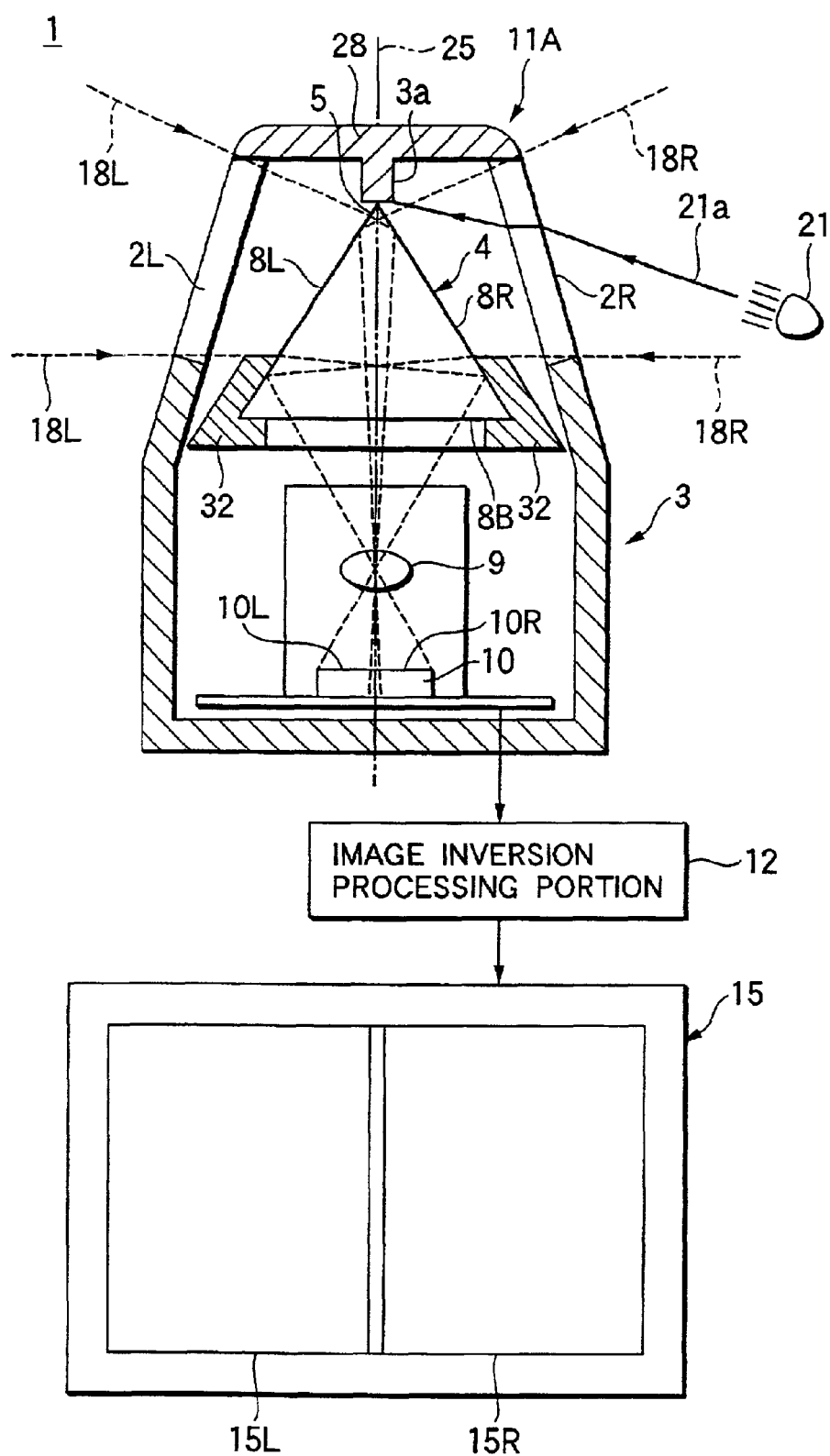
FIG. 15 is a diagram illustrating an apparatus for watching around a vehicle in a second example of proposal.

The prism 4 of an imaging device 11E according to this embodiment of the invention is as shown in FIG. 12 formed substantially into a pentagon in top plan view by cutting the outside of a range of horizontal viewing angles for use in visually recognizing the surroundings in a portion where the sides 8R and 8L of the prism 4 are adjacent to the rear side 8B of the prism 4. Then a light scattering plane 63 is formed by subjecting the cut plane (cutout plane) 61 to abrasive blasting similarly as described in Embodiment 4 of the invention and moreover the surface of the light scattering plane 63 is colored with black paint (not shown).

Thus, partially reflected stray light can be scattered by the light scattering plane 63 in the area (including the points P4 and P6 in Embodiment 1) processed by the abrasive blasting and moreover the stray light can also be absorbed by the black paint. Therefore, according to this embodiment of the invention, stray light is repeatedly reflected in the prism 4 and when it ultimately reaches the point P10, the quantity of stray light greatly attenuates, whereby the quality of the image picked by the imaging device 11E can be improved.

In Embodiment 2 shown in FIGS. 6 and 7, for example, the formation of only the light absorbing film 41 with the omission of the internal reflection preventive film 37 on the rear side 8B of the prism 4 allows the quantity of stray light to be smaller than that in the conventional example and the exemplary proposals because the stray light is absorbed by the light absorbing film 41 at the points P4 and P6.

In Embodiments 3 and 4, moreover, the light absorbing film 41 may be formed in the predetermined areas on the sides 8R and 8L of the prism 4 as in Embodiment 2.

According to the invention described in aspects 3, 6 and 7, even though it is attempted for stray light to totally reflect from the rear side of the prism after passing through the right and left sides of the prism from the respective transmission window portions successively and then entering the prism, the stray light is prevented by the internal reflection preventive film from being totally reflected from the rear side of the prism. Therefore, it is possible to suppress the quantity of stray light repeatedly reflected in the prism as a result of the total reflection from the rear side of the prism, so that the quality of the image picked up by the imaging device is improved.

According to the invention described in aspects 4, 8, 10, 13 and 16, the quantity of stray light repeatedly reflected in the prism can be suppressed by making black color absorb the stray light, so that the quality of the image picked up by the imaging device is improved.

According to the invention described in aspect 5, as the adhesive member for sticking the buffer member to the rear side of the prism is simultaneously used as the internal reflection preventive means, the quantity of stray light repeatedly reflected in the prism can be suppressed without using a special member, so that the quality of the image picked up by the imaging device is improved.

According to the invention described in aspect 9, even though it is attempted for stray light to totally reflect from the rear side of the prism after passing through the right and left sides of the prism from the respective transmission window portions successively and then entering the prism, the stray light is prevented by the light scattering plane formed on the rear side of the prism from being totally reflected. Therefore, it is possible to suppress the quantity of stray light repeatedly reflected in the prism as a result of the total reflection from the rear side of the prism, so that the quality of the image picked up by the imaging device is improved.

According to the invention as described in aspects 11 and 12, as the light absorbing means for absorbing light resulting from the partial reflection of the stray light from the side of the prism is formed in part of the side of the prism, the quantity of stray light repeatedly reflected in the prism can be suppressed, so that the quality of the image picked up by the imaging device is improved.

According to the invention as described in aspect 14, as the corner portions formed with the sides of the prism and the rear side of the prism are cut in a range excluding a range of horizontal viewing angles of the prism, stray light is prevented from repeatedly reciprocate between the rear side of the prism and the rear side of the prism. Therefore, the quantity of stray light repeatedly reflected in the prism can be suppressed, so that the quality of the image picked up by the imaging device is improved.

According to the invention as described in aspect 15, as the light scattering plane is formed on each of the surfaces formed by cutting the corner portions, the quantity of stray light can be suppressed by scattering the stray light repeatedly reflected in the prism, so that the quality of the image picked up by the imaging device is improved.

What is claimed is:

1. An apparatus for watching around a vehicle, comprising:
    an imaging device including;
        a casing disposed on an outer side of said vehicle and having a pair of right and left transmission window portions in either side of said casing;
        a prism contained in said casing in the form of an isosceles triangle in section with a vertical angle directed to a front part of said casing, the right and left sides of said prism which correspond to the equal sides of the isosceles triangle being directed to the respective right and left transmission window portions; and
        an imaging element disposed to the rear of said prism and used for converting a ray of light from the left and right sides of said prism into respective left and right image signals by concentrating light on an imaging plane via an imaging lens, the ray of light being incident on one of the right and left sides of said prism, reflected from the other side of said prism and emitted from the rear side of said prism to said left and right image signals; and
    an internal reflection preventive means for preventing stray light from undergoing total reflection forms a light transmission window on the rear side of said prism, the internal reflection preventive means being sufficiently sized to cover at least a portion of the rear side of said prism and prevent stray light entering from the left and right sides of said prism from entering into the opposing left and right image signals.

2. The apparatus for watching around a vehicle in claim 1, wherein
    said internal reflection preventive means is an adhesive member for sticking to the rear side of said prism;
    a predetermined holder for supporting said prism; and
    a buffer member for buffering said prism from vibration from said holder.

3. The apparatus for watching around a vehicle in claim 2, wherein said adhesive member is colored black so as to absorb the stray light.

4. The apparatus for watching around a vehicle in claim 1, wherein said internal reflection preventive means includes a light scattering plane formed outside an effective area with respect to said imaging element disposed to the rear of said prism.

5. The apparatus for watching around a vehicle in claim 4, wherein black paint for absorbing stray light is applied to the light scattering plane.

6. The apparatus for watching around a vehicle in claim 1, wherein light absorbing means for absorbing light resulting from the partial reflection of the stray light from the side of said prism is formed in part of the side of said prism.

7. The apparatus for watching around a vehicle as claimed in claim 6, wherein said light absorbing means is black paint.

8. An apparatus for watching around a vehicle, comprising:
   an imaging device including;
      a casing disposed on the outer side of the vehicle and having a pair of right and left transmission window portions in either side of the casing; and
      a prism contained in said casing in the form of an isosceles triangle in section with its vertical angle directed to the front part of the casing, the prism having a left, right and rear side, the right and left sides of the prism which correspond to the equal sides of the isosceles triangle being directed to the respective right and left transmission window portions; and
      an imaging element disposed to the rear of said prism and used for converting a ray of light from the left and right sides of said prism into respective left and right image signals by concentrating light on an imaging plane via an imaging lens, the ray of light being incident on one of the right and left sides of said prism, reflected from the other side of said prism and emitted from the rear side of said prism to said left and right image signals; and
   light absorbing means for absorbing light resulting from the partial reflection of the stray light from the left and right side of said prism is sufficiently sized on at least the rear side of said prism prevent the stray light from appearing on the opposing left and right image signals, the light absorbing means including a predetermined holder for supporting said prism and a buffer member to buffer said prism against vibration from said predetermined holder.

9. The apparatus for watching around a vehicle as claimed in claim 8, wherein said light absorbing means is black paint.

10. An apparatus for watching around a vehicle, comprising:
   an imaging device including;
      a casing disposed on the outer side of said vehicle and having a pair of right and left transmission window portions in either side of said casing;
      a prism contained in said casing in the form of an isosceles triangle in section with a vertical angle directed to the front part of said casing, the right and left sides of said prism which correspond to the equal sides of the isosceles triangle being directed to the respective right and left transmission window portions;
      an imaging element disposed to the rear of said prism and used for converting a ray of light from the left and right sides of said prism into respective left and right image signals by concentrating light on an imaging plane via an imaging lens, the ray of light being incident on one of the right and left sides of said prism, reflected from the other side of said prism and emitted from the rear side of said prism to said left and right image signals; and
   internal reflection preventive means sufficiently sized on at least the rear side to prevent stray light having an incident angle of at least 50° and preventing total reflection according to the following equation:
      $n_1$=refractive index of the internal reflection preventive means
      $n_2$=refractive index of prism
      $\theta_1$=incident angle of stray light
      $n_1 > \sin \theta_1 \times n_2$, so that stray light from one of the left and right window portions greater than 50° incidence is prevented from total reflectance through the prism and entry into the opposite image signal.

11. The apparatus for watching around a vehicle as claimed in claim 10, wherein corner portions formed with the sides of said prism and the rear side of said prism are cut in a range to exclude a range of horizontal viewing of said prism and to prevent stray light from the left and right sides of said prism from appearing on the opposing left and right image signals.

12. The apparatus for watching around a vehicle as claimed in claim 10, wherein a light scattering plane is formed on each of the surfaces formed by cutting the corner portions.

13. The apparatus for watching around a vehicle as claimed in claim 12, wherein black paint for absorbing stray light is applied to the light scattering plane.

14. The apparatus for watching around a vehicle according to claim 1, wherein the internal reflection preventive means relates with said prism according to the following equation:
   $n_1$=refractive index of the internal reflection preventive means
   $n_2$=refractive index of prism
   $\theta_1$=incident angle of stray light
   $n_1 > \sin \theta_1 \times n_2$, so that the internal reflection preventive means deflects light at an incident angle greater than a predetermined value.

15. The apparatus for watching around a vehicle in claim 14, wherein the refractive index of said preventive means total reflection of stray light having an incident angle at least 50°.

16. The apparatus for watching around a vehicle in claim 14, wherein the refractive index of said preventive means prevents total reflection of stray light having an incident angle of approximately 65°.

17. The apparatus for watching around a vehicle in claim 16, wherein said internal reflection preventive means is an internal reflection preventive film and said film is formed of black paint of index $n_1$ which absorbs the stray light.

* * * * *